United States Patent [19]
Rogers

[11] 3,785,342
[45] Jan. 15, 1974

[54] SELF-CLEANING AQUARIUM

[76] Inventor: George H. Rogers, 3160 Wright St., Denver, Colo. 80215

[22] Filed: Mar. 31, 1972

[21] Appl. No.: 240,169

[52] U.S. Cl. ................................................ 119/5
[51] Int. Cl. .......................................... A01k 63/00
[58] Field of Search .................... 119/5, 3; 210/169

[56] References Cited
UNITED STATES PATENTS

| | | | |
|---|---|---|---|
| 3,418,973 | 12/1968 | Shinichi Saito | 119/5 X |
| 3,693,798 | 9/1972 | White | 210/169 |
| 3,116,712 | 1/1964 | Ogden et al. | 119/5 X |
| 3,347,211 | 10/1967 | Falkenberg et al. | 119/5 |

*Primary Examiner*—Hugh R. Chamblee
*Attorney*—Reilly and Lewis

[57] ABSTRACT

A self-cleaning aquarium includes a tank with a perforated partition spaced a small distance from the bottom of the tank to define an upper display portion and a lower drainage portion. Disposed within the drainage portion and resting on the bottom of the tank is a funneling drainage plate for receiving sedimentary material in the tank which passes through the perforated partition. The drainage plate has drain openings connected to a suction tube which draws the sedimentary material and liquid in the drainage portion of the tank out of the tank and directs it through an external filter including a pump for pumping the clarified liquid back into the tank. In the preferred form the filter is a watertight container having a removable receptacle for retaining filtering material and is designed so that the receptacle can be easily removed to periodically change the filter material.

13 Claims, 7 Drawing Figures

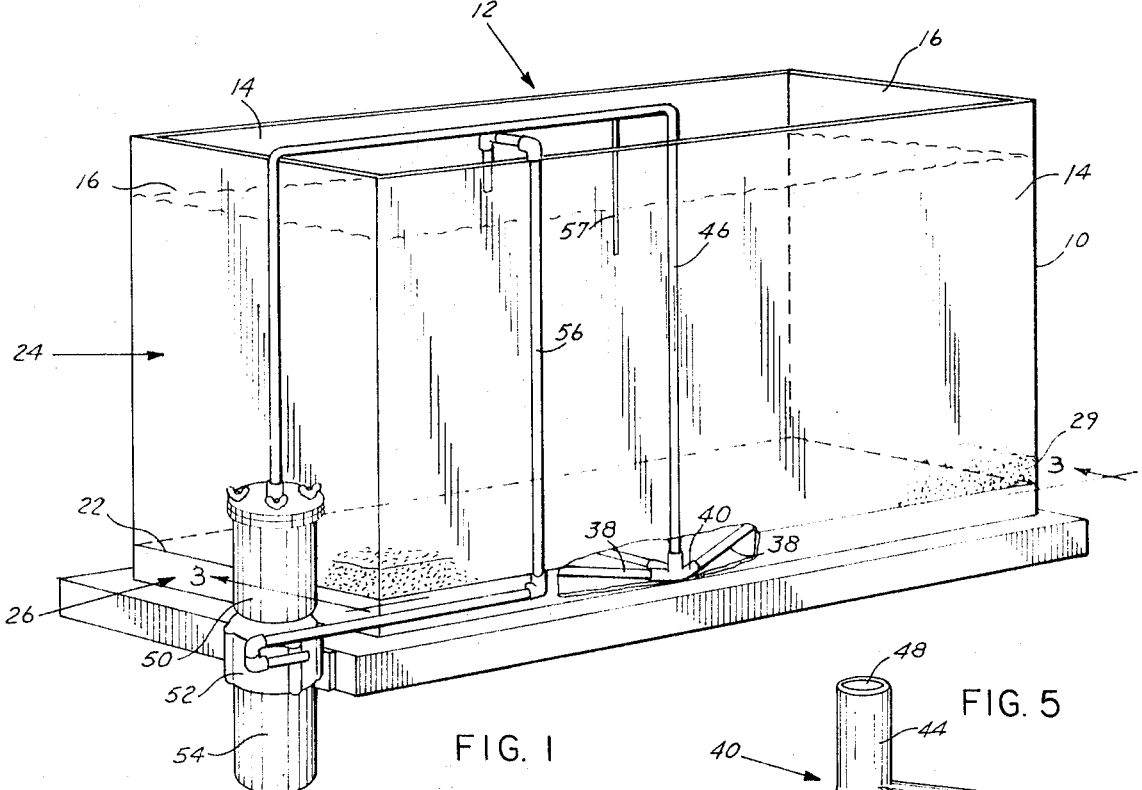
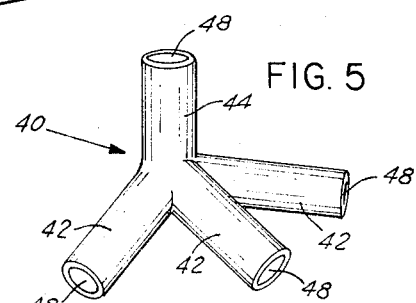
FIG. 1
FIG. 5
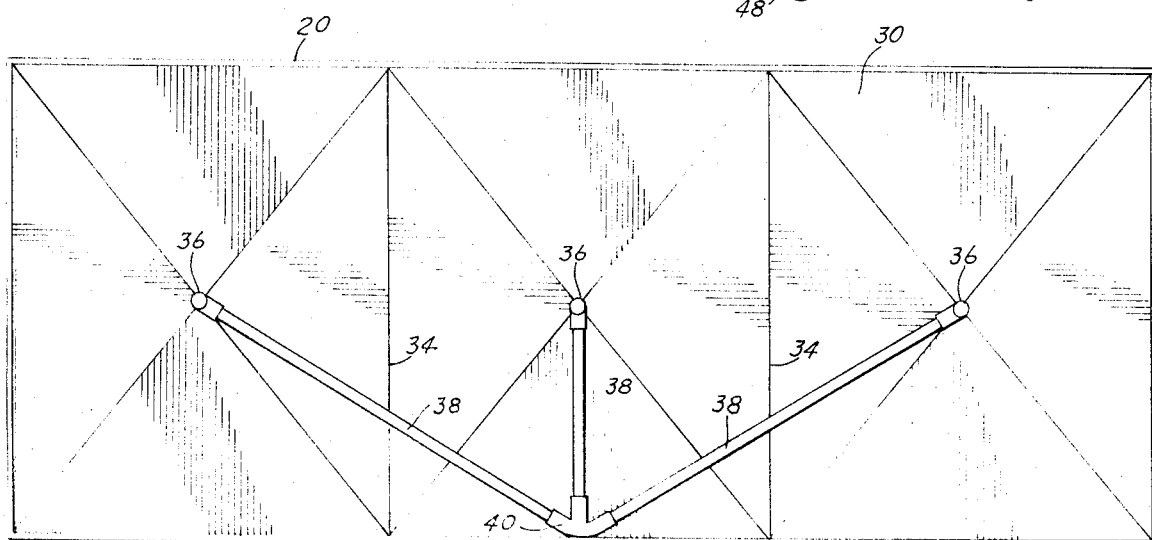
FIG. 2
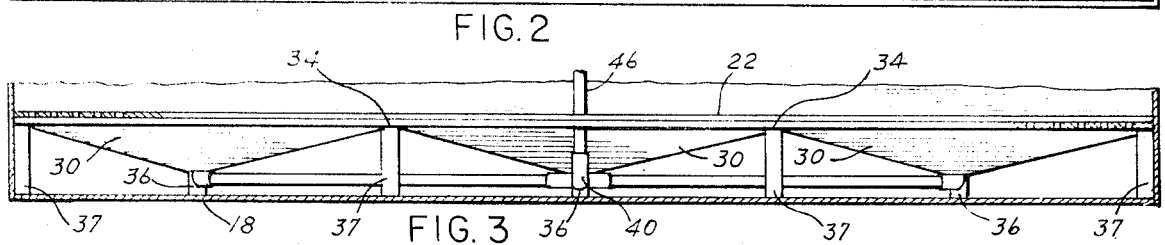
FIG. 3

PATENTED JAN 15 1974 3,785,342
SHEET 2 OF 2
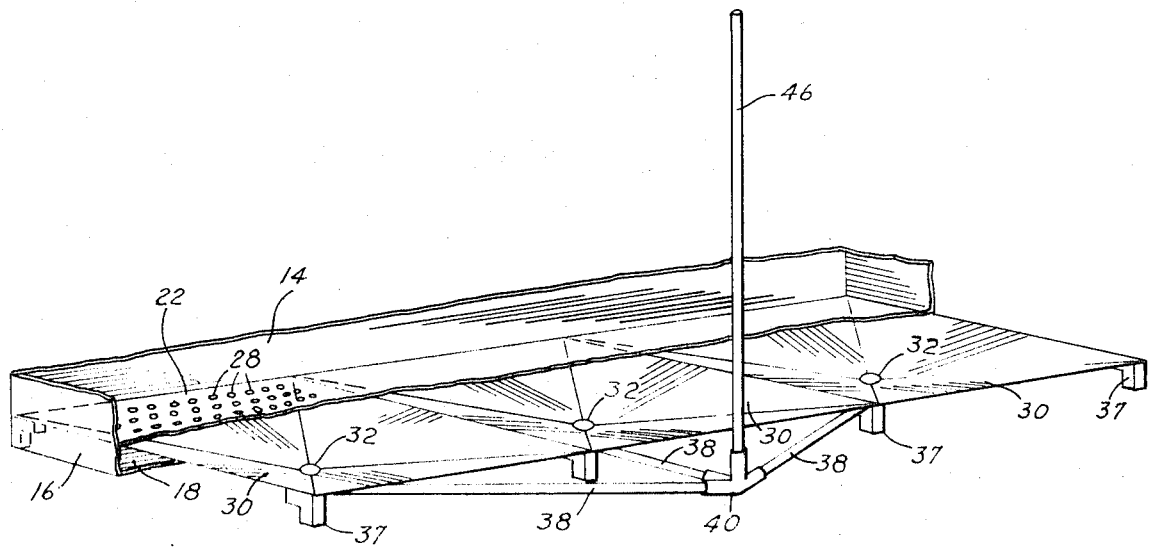
FIG. 4
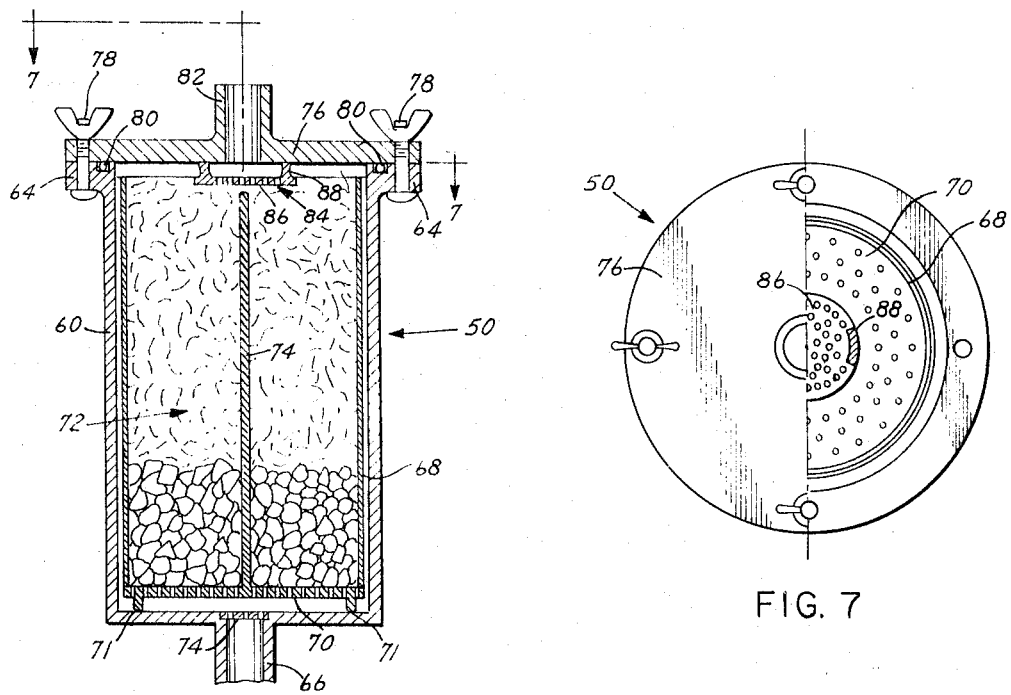
FIG. 6
FIG. 7

SELF-CLEANING AQUARIUM

The present invention generally concerns liquid tanks for aquatic plants and animals and more particularly concerns a self-cleaning aquarium wherein a circulating water line is provided for drawing solid material out of the tank and passing it through a filter in the water line to remove the solid material so that clarified water can be reintroduced into the aquarium tank.

Individuals who maintain or have maintained an aquarium are fully aware of the repeated necessity of cleaning the aquarium. Most aquariums that are maintained in homes are of the tank type and include a layer of rock or similar material on the bottom of the tank as well as various types of aquatic plants. Means are normally provided for circulating air through the water in the tank to provide the aquatic plants and animals with oxygen. Due to the secretion rate of aquatic animals, it is necessary that the tank be frequently cleaned, otherwise, the secreted waste material accumulates in the tank creating an undesirable sedimentary deposit. Additionally, the secreted waste material clouds the water and creates an unhealthy environment for the aquatic animals.

To clean the tanks, it has previously been necessary that the aquatic plants and animals be removed from the tank along with the water and the rocks or other material on the bottom of the tank, and finally the tank scrubbed to remove deposits of sedimentary material that have formed on the walls and bottom of the tank. This is not only a messy job but a time-consuming one and is normally dreaded by aquarium owners. The prospect of going through this undesirable cleaning operation is also a discouragement to prospective owners of aquariums and in many cases is the very reason that individuals do not like to maintain and raise aquatic animals.

The aquarium of the present invention is selfcleaning and includes a mechanism for receiving sedimentary material on the bottom of the tank and drawing it through a suction line that directs it out of the tank. In the preferred form, to be described in detail hereinafter, the sedimentary material removed from the tank is directed, along with water from the tank, through a unique filter where the sedimentary material is removed from the water and the clarified water pumped back into the tank so that water in the tank is continuously recirculated. The tank for the aquarium is provided with a perforated partition near the bottom of the tank that overlies a funneling drainage plate disposed to receive undesirable sedimentary material and urge it into drainage openings that are connected to the suction line. The perforated plate serves to support rocks or other similar material that may be placed on the bottom of an aquarium, but the openings in the perforated plate are large enough to allow the smaller undesirable sedimentary material, such as, the secreted waste products of the aquatic animals, to pass therethrough, so that they can be received on the underlying drainage plate. Provision is also made in the suction line adjacent the top water level in the tank for a smaller diameter, ancillary suction line that protrudes into the water a short distance to draw lighter suspended solid particles from the upper display portion of the tank. This prevents the water from becoming merky and obscured whereby a healthier and more attractive aquarium is maintained.

The filter used to remove the solid particles from the circulating water includes a water-tight container having a receptacle for holding conventional filtering material. The container has a removable watertight top so that the receptacle can be easily taken from the container without having to touch the dirtied filter material. In this manner, the dirtied filter material can be thrown away and clean filtering material replaced in the container in a neat, clean and simple operation. The filter is mounted on an electrically driven water pump which draws the water through the filter and directs it through a return line back into the tank.

Accordingly, it is an object of the present invention to provide a new and improved self-cleaning aquarium or liquid tank for aquatic plants and animals.

It is another object of the present invention to provide an aquarium having a drainage plate at the bottom thereof and means connected to the drainage plate for removing undesired sedimentary material from the tank.

It is another object of the present invention to provide an aquarium having a lower drainage portion for receiving undesired sedimentary material and a suction line for drawing the sedimentary material off the drainage plate and removing it from the tank.

It is still another object of the present invention to provide an aquarium having a drainage plate for receiving sedimentary material in the tank and a suction line for drawing the sedimentary material from the drainage plate and directing it out of the tank through a filter-pump combination in which the solid material is removed from the water and the clarified water pumped back into the tank for recirculation.

It is another object of the present invention to provide a filter for use with a liquid circulating system of an aquarium whereby solid material carried in the circulating line is removed therefrom and the clarified liquid pumped back into the tank.

It is still another object of the present invention to provide a filter for use with an aquarium having a recirculating water line, the filter including a removable receptacle for facilitating change of the filtering medium.

Other objects, advantages and features of the present invention will become more readily appreciated and understood from a consideration of the following detailed description when taken in conjunction with the following drawings, in which:

FIG. 1 is a perspective view of an aquarium employing the drainage and filtering system of the present invention.

FIG. 2 is a bottom plan view of the drainage plate used in the aquarium of FIG. 1.

FIG. 3 is a side elevation of the drainage plate shown in FIG. 2.

FIG. 4 is a perspective view of the bottom portion of the aquarium of FIG. 1 with parts broken away for clarity.

FIG. 5 is an enlarged perspective view of the union element used with the drainage plate shown in FIG. 2.

FIG. 6 is a vertical section taken through the filter device shown with the aquarium of FIG. 1; and FIG. 7 is a half-sectioned top plan view of the filter device of FIG. 6.

Referring first to FIG. 1, the water tank 10 of the aquarium 12, is seen from the rear side thereof having the cleaning mechanism of the present invention as a part thereof. The water tank as shown is of the conventional type having side walls 14, end walls 16, a bottom wall 18 (FIGS. 3 and 4) and an open top. The side and end walls are normally of a glass or similar transparent material so that aquatic plants and animals in the tank can be observed from the exterior.

Looking now at FIGS. 3 and 4, a uniquely funnel drainage plate 20 is seen to rest on the bottom 18 of the tank and covers the entire bottom surface of the tank. A perforated partition 22 is supported by the drainage plate to entirely cover the drainage plate; however, the perforated partition could be supported by other suitable means of support (not shown) integrated with the interior surface of the side and end walls of the tank, if desired, so that the weight of the perforated partition 22 and whatever material that may be supported by it are not resting on the drainage plate 20. The perforated partition 22 divides the tank into an upper display portion 24 wherein aquatic plants and animals are confined, and a lower drainage portion 26 which will be described in more detail hereinafter. In the preferred form, the perforated partition 22 is a sheet of plastic material having a plurality of uniformly spaced openings 28 (FIG. 4) passing therethrough of a size such that rock material 29 or other similar material, normally placed on the bottom of an aquarium will be supported by the partition 22 and not pass through the openings in the partition. However, it is important that the openings be large enough that undesirable sedimentary material, such as, secreted waste products of the aquatic animals, will pass through the openings after filtering down through the rocks supported by the partition. It has been found that openings having a 1/16 inch diameter and being spaced three-eighths of an inch apart will support most commercially available rock material used in aquariums while allowing the undesirable sedimentary material to pass therethrough.

The drainage plate 20 as seen in FIGS. 2, 3 and 4 is divided into three adjacent conically shaped upwardly opening surfaces 30 of polygonal transverse cross-section. The conical surfaces 30 have open lower centrally located apexes defining drainage openings 32 and the surfaces are connected along adjacent upper edges 34 to form the unitized drainage plate. It should be noted at this point that other shapes and size of funnel surfaces could be utilized to give a similar result but from experimentation the disclosed arrangement of the funnel surfaces was found to give the most effective drainage results with the recycling system used and which will be described in detail hereinafter. The drainage plate is also made of a plastic material so that it can be easily formed from pre-cut segments of plastic.

The drainage opening 32 at the apex of each conical surface 30 is aligned with a depending cylindrical element 36 that is affixed to the underside of the associated conical surface. Each of the cylindrical elements 36 has a hollowed upper half in communication with the associated drainage opening and a solid lower half. The lower ends of the cylindrical elements rest on the bottom wall 18 of the aquarium tank 10 and thereby in cooperation with legs 37 support the drainage plate 20. Each of the cylindrical elements has a radial opening (not seen) passing through its wall in communication with the hollowed portion of the cylindrical element, and connector tubes 38, are secured to the cylindrical elements 36 to establish communication between the open passage through the connector tubes 38 and the hollowed portion of the associate cylindrical element.

In this manner, it will be seen that the connector tubes 38 are in fluid communication with the space above the drainage plate 20 through the associated cylindrical element 36 and the associated drainage opening 32. The opposite ends of the connector tubes are commonly joined to a union element 40 (FIGS. 2, 3, 4 and 5) having three radially extending arms 42 to which the connector tubes are secured. The union element 40 is also provided with an upwardly extending arm 44 to which an outlet tube 46 is attached. Each of the arms 42 and 44 in the union element have passages 48 therethrough which communicate with each other so that the outlet tube 46 is in fluid communication with each of the connector tubes 38 and consequently with the space above the drainage plate 20.

The outlet tube 46 preferably passes upwardly out of the tank 10 adjacent one of the tank walls, but it is contemplated that the outlet tube could extend through one of the tank walls if an appropriate opening were provided. After emerging from the tank, the outlet tube is connected to the top of the filter device 50, which will be described in more detail later, and the filter device is in turn connected to a water pump 52 which is driven by a motor 54, whereby clarified liquid emerging from the filter device can be pumped back into the tank through a return tube 56. In order that lighter solid particles which may become suspended in the water are removed from the tank, to prevent the water from becoming murky and obscured, an ancillary removal tube 57 is connected in fluid communication with the outlet tube 46 near the location where the outlet tube 46 emerges from the tank. The ancillary removal tube 57 is of a smaller diameter than the outlet tube 46 so that it does not detract substantially from the suction effect of the outlet tube 46 but does adequately attract and remove suspended solid particles, in the display portion 24 of the tank. It can, therefore, be appreciated that a recirculating line is established which includes the connector tubes 38, the outlet tube 46, the ancillary removal tube 57, the filter 50, the pump 52 and the return tube 56.

The cleaning mechanism functions most effectively if a siphoning effect is established in the recirculating line. To get the siphoning effect started, it is a simple matter to lower the unattached end of the return tube 56 below the bottom level of the tank so that liquid in the drainage portion 26 of the tank begins to siphon through the outlet line 46, the filter 50, the pump 52 and finally the return line whereupon the return tube can again be positiond to extend down toward the water in the tank so that the pump will maintain the water flow through the recirculating line. It will be appreciated that the end of the return tube is spaced from the liquid level in the tank to provide aeration of the liquid so that the need for a separate air pump is eliminated. It should also be noted that the heat from the water pump 52 adequately heats the circulating liquid so that no heating unit is necessary.

Looking more specifically now at the filter device 50 used to remove the solid material from the circulating water so that only clarified water is returned to the tank, reference is made to FIGS. 6 and 7 wherein the filter device is shown in detail. The filter device is seen to include a cylindrically shaped container 60 having an open upper end 62 with a top annular flange 64. The bottom of the container 60 is closed except for a centrally located tubular outlet 66. A receptacle 68 in the form of a cup having a perforated bottom 70 with legs 71 is slidably received in the container 60 and is adapted to retain filtering material 72. The receptacle 68 is provided with a centrally located, axially extending rod 74 secured to the bottom 70 which serves as a handle that is readily accessible to an individual in cleaning the filter device whereby the receptacle can be lifted vertically out of the container and the filter material removed from the receptacle. Clean filter material can then be placed in the receptacle and the receptacle replaced in the cylinder for continued use. The filter material may be any one or combination of various available filtering materials such as charcoal granules, cotton, floss, spun glass, etc. The filter material shown in FIG. 5 is a layer of spun glass superimposed on a lower layer of charcoal granules. The bottom 70 of the receptacle as was mentioned before, is perforated whereby it will retain the filter material in the receptacle but will allow clarified water to pass therethrough and through the centrally located tubular outlet 66 at the bottom of the container. The tubular outlet 66 is provided with an internal annular shoulder upon which a perforated disk 74 is placed that serves as a safety screen to prevent solid particles greater than a predetermined size from passing through the tubular outlet and subsequently into the pump 52 which is connected to the outlet beneath the filter device.

A top 76 for the container 60 is removably attached to the annular flange 64, by four bolts 78 which are received in aligned circumferentially spaced openings passing through the top and the annular flange of the container. A hermetic seal is established at the interface between the top and the annular flange by an O-ring 80 received in aligned circular grooves cut in the inner surface of the top 76 and in the upper surface of the annular flange 64. A centrally located inlet tube 82 is provided in the top 76, and serves as a connector that is adapted to attach to the outlet tube 46 from the tank so that water drawn from the tank will pass into the filter device.

A baffle 84 is suspended from the inner surface of the top 76 in alignment with the tubular passage 82 to partially deflect water entering the filter device so that the water is dispersed across the entire cross-sectional area of the filter device and is not concentrated in a small area at the center. The baffle as can be seen in both FIGS. 6 and 7 is a perforated disc 86 suspended from the inner surface of the top by four circumferentially spaced legs 88. It can readily be seen that water entering the filter through the tubular passage 82 will immediately strike the baffle, some of the water passing through the perforations in the disc 86 and the remainder of the water being deflected laterally so as to pass through openings between the legs 88.

Referring now to the aquarium 12 as a whole, a layer of rock 29 or other decorative material may be spread over the perforated partition 22 to give the aquarium the normal desired appearance. Aquatic plants or the like may be embedded in the rock layer to enhance the aesthetic appearance of the aquarium and thereby create an attractive upper display portion 24 of the tank.

To start operation of the self-cleaning system, a siphon effect is established in the recirculating line as discussed hereinbefore and the pump 52 started to maintain a continuous flow of liquid from the drainage portion 26 of the tank through the outlet tube 46 and from the display portion 25 through the ancillary removal tube 57, the filter device 50, the pump 52, and finally the return tube 57. In this manner a circulating system is effected whereby water in the tank is continuously removed, filtered for cleaning and returned to the tank. Solid material in the tank, that may take the form of secreted waste products of the aquatic animals, will generally settle to the bottom of the tank, and due to the lower pressure in the drainage portion of the tank caused by the suction effect of the outlet tube 46, will tend to work through the rock particles and the perforated partition whereby they will be deposited on one of the conical drainage surfaces beneath the partition. The suction in the outlet tube is effective, through the drainage holes in the bottom of the conical surfaces, to draw the sedimentary solid materials downwardly along the conical surfaces until they pass through the drainage openings and are subsequently taken out of the tank through the outlet line.

Solid particles in the water that are not heavy enough to sink and that remain suspended in the water, are attracted toward the smaller ancillary removal tube 57 and will be drawn into the outlet line 46 through the ancillary tube whereby all of the solid materials in the tank are removed and passed into the filter device. The solid particles are prevented from passing through the filter device by the filter material and are thereby retained in the filter while the water passes through the filter material and the perforated bottom of the receptacle 68 and is directed by the pump back through the return line to the tank. Periodically the pump can be turned off and the filter cleaned by removing the top of the filter, lifting the receptacle out of the filter, removing the dirty filter material and replacing it with clean filter material. It can, therefore, be appreciated that the aquarium of the present invention is a self-cleaning aquarium and alleviates the previously necessary and undesirable task of cleaning the aquarium wherein the tanks had to be completely emptied and scrubbed to get them adequately cleaned.

It is to be understood that the foregoing description is given by way of illustration and that variations may be made in the construction and arrangement of parts without departing from the spirit and scope of the present invention.

What is claimed is:

1. A self-cleaning aquarium comprising in combination:
    a water-containing tank,
    said tank having a lower wall with a plurality of upwardly divergent conical surfaces of polygonal transverse cross-section arranged in side-by-side relation to one another, each surface having a drain positioned at its apex to receive sedimentary material moving downwardly across the associated conical surface,
    a suction tube connected to the drain to withdraw water and sedimentary material from the tank, and
    means for supplying clarified water to the tank to replace the water removed by the suction tube.

2. The aquarium of claim 1 wherein each of said drains are operably connected in fluid communication with the same suction tube.

3. The aquarium of claim 1 further including a perforated substantially horizontal partition immediately above the conical surfaces whereby rocks of a predetermined size can be supported on the partition but sedimentary material of a smaller size can pass through the partition onto the conical surfaces.

4. The aquarium of claim 1 further including a secondary suction tube connected in fluid communication with the first-mentioned suction tube at a location near the liquid level in said tank, said secondary suction tube having a smaller cross-sectional area than the first-mentioned suction tube and extending into the liquid in a position to attract solid particles that are suspended in the liquid in the tank so that they can be removed from the tank along with the sedimentary material through said first-mentioned suction tube.

5. A self-cleaning aquarium comprising in combination a liquid containing tank having side walls and a bottom wall, a plurality of juxtaposed, upwardly divergent conical surfaces of polygonal transverse cross-section on a lower wall disposed in the tank adjacent the bottom wall, a downwardly opening drain at the apex of each conical surface, a suction tube extending from beneath the lower wall through the top of the tank, connecting tubes attached to a lower portion of the suction tube and to each of said drains whereby each of said drains is in fluid communication with the suction tube so that liquid and sedimentary material on the conical surfaces can be drawn through the drain and expelled from the tank through the suction tube, replenishing means for filling the tank with a volume of liquid equivalent to the volume of liquid withdrawn by the suction tube, and a perforated partition disposed in the tank immediately above the conical surfaces, the perforations in the partition being of a size such that rocks of a predetermined size will be supported on the partition and sedimentary material of a smaller size will pass through the partition and will be deposited on the conical surfaces for removal from the tank.

6. A self-cleaning aquarium comprising in combination a liquid-containing tank, said tank having a lower wall having at least one inclined surface, a drain positioned near the lower end of the inclined surface to receive sedimentary material moving downwardly across the inclined surface, a suction tube connected to one end of the drain and passing upwardly through the lower wall to a location exteriorly of the tank to draw liquid and sedimentary material from the inclined surface, a filter device exteriorly of the tank disposed to receive liquid passing through said suction tube, a return tube operatively connected to the filter to direct the liquid passing through the filter back into the tank, and pumping means operatively arranged to effect movement of the liquid through the return tube whereby liquid in the tank is recycled and sedimentary material in the tank is removed therefrom and captured in the filter.

7. The aquarium of claim 6 wherein said pump is a liquid pump and is operatively connected to the outlet from said filter device so as to receive liquid from the filter and force it through the return tube back to the tank.

8. The aquarium of claim 6 wherein said filter device includes an enclosed chamber having an inlet and an outlet, a filtering material confined in the chamber which will block the passage of solid particles but will admit the passage of the liquid, and a removable cap which when removed permits removal and replacement of the filtering material whereby the filter device can be easily cleaned.

9. The aquarium of claim 8 wherein said inlet has connector means for fluid-tight attachment to the suction tube and said outlet has connector means for fluid-tight attachment to said pumping means.

10. The aquarium of claim 9 further including a baffle within said enclosed chamber of the filter device adjacent the inlet thereto to disperse liquid passing into the chamber.

11. The aquarium of claim 10 wherein said enclosed chamber of the filter device is enlongated with the inlet at one end and the outlet at the other, said removable cap being at the inlet end of said chamber, and said filter device further including a removabl retainer for said filter material whereby the filter material can be removed from the chamber by removing the cap and the retainer.

12. The aquarium of claim 11 wherein said inlet of the filter device is in the removable cap and wherein said baffle comprises a planar plate with a plurality of openings therethrough and is affixed to the cap in alignment with said inlet.

13. A self-cleaning aquarium comprising in combination:
- a water-containing tank having a bottom wall,
- a lower wall with an inclined surface, the lowermost extent of the inclined surface being closely adjacent to said bottom wall,
- a drainage opening in the lower wall adjacent the lowermost extent of the incline surface adapted to receive sedimentary material moving downwardly across the inclined surface,
- a suction tube communicating with said drainage opening, said suction tube passing between said lower wall and the bottom wall of the tank then extending upwardly through the lower wall to a location exteriorly of the tank to carry water and sedimentary material from the tank, and
- means for supplying clarified water to the tank to replace the water removed by the suction tube.

* * * * *

UNITED STATES PATENT OFFICE
CERTIFICATE OF CORRECTION

Patent No. 3,785,342      Dated January 15, 1974

Inventor(s) George H. Rogers

It is certified that error appears in the above-identified patent and that said Letters Patent are hereby corrected as shown below:

In the Specification:

Column 3, line 44, cancel "size" and substitute --sizes--
line 67, cancel "associate" and substitute --associated--

Column 4, line 50, cancel "positiond" and substitute --positioned--

Column 6, line 2, cancel "57" and substitute --56--

Signed and sealed this 23rd day of July 1974.

(SEAL)
Attest:

McCOY M. GIBSON, JR.
Attesting Officer

C. MARSHALL DANN
Commissioner of Patents